Oct. 17, 1944.　　　O. J. WILBOR ET AL　　　2,360,808
ORE SEPARATOR
Filed Oct. 13, 1941　　　2 Sheets-Sheet 1

Inventors:
Oscar J. Wilbor,
Joseph T. Misiak.

Oct. 17, 1944.　　　O. J. WILBOR ET AL　　　2,360,808
ORE SEPARATOR
Filed Oct. 13, 1941　　　2 Sheets-Sheet 2
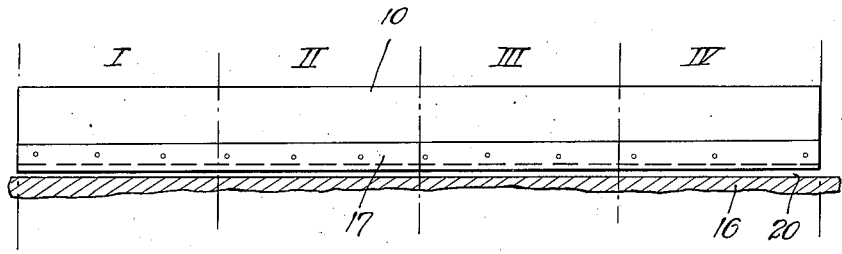
Fig. 3.
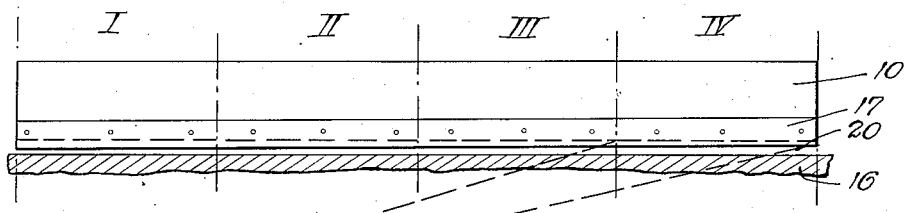
Fig. 4.
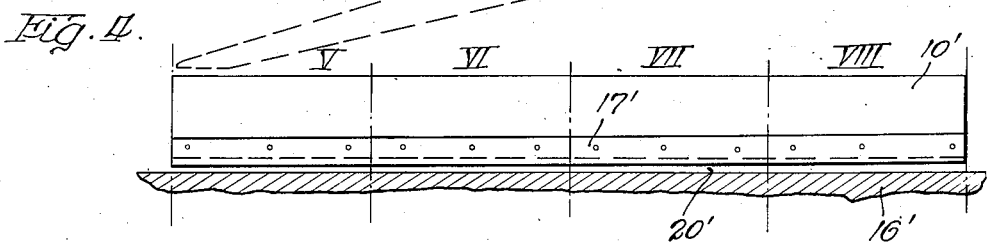
Fig. 6.　　　　　　　　　　　　　　　　Fig. 5.
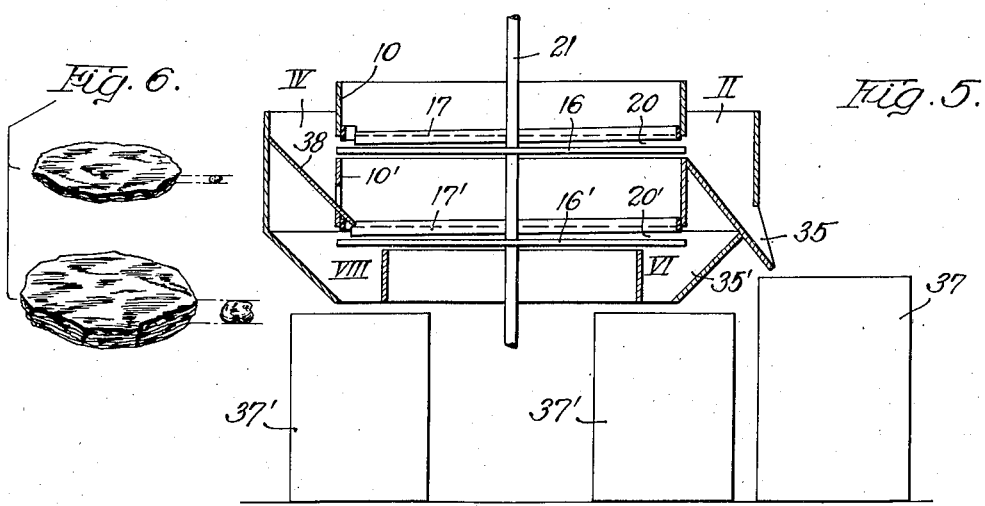
Inventors:
Oscar J. Wilbor,
Joseph T. Misiak.
By
Attys.

Patented Oct. 17, 1944

2,360,808

UNITED STATES PATENT OFFICE 2,360,808

ORE SEPARATOR

Oscar J. Wilbor and Joseph T. Misiak, Chicago, Ill., assignors to Chicago By-Products Corporation, Chicago, Ill., a corporation of Illinois Application October 13, 1941, Serial No. 414,734

1 Claim. (Cl. 209—90)

The present invention relates to ore separators and more particularly to ore separators of a driven turn-table type for the separation of substantially tablet-like or flake-like material from solid material whose three dimensions are more nearly equal.

Though our invention is adapted to separate any substantially flake-like material from lumped material in ores, it was developed specifically for action on such natural ores as "Vermiculite," "Biotite," Jeffersite" and the like. These ores comprise layers or flakes of silica inter-laid with earthy material. When such ore is leached with sulphuric acid, the earthy material is dissolved and the thin silica flakes remain. The resulting product goes by the name of "Lamisilite" and its production and properties are fully set forth in the patent to one of present applicants and his co-inventor in Patent No. 1,898,774.

This "Lamisilite" has great adsorptive powers, adsorbing as much as 20% of its weight in moisture. For commercial production, then, it is essential to separate the flat flakes or tablets, which have a certain amount of earthy material in them, from the lumps of rock and earthy material of the crushed ore.

Hand separation is slow, and it is often inaccurate because the glare of either artificial or real light reflected from both the flakes and the rock tends to affect the workers' eyesight. Also the two materials are of substantially the same color much of the time. Workers doing such separation must take frequent rest periods for the protection of their eyes.

A faster and more accurate method of separation was therefore necessary since the tablets or flakes, after this separation, must be treated for a certain length of time in baths of sulphuric acid to eat out or dissolve the earthy material scattered through the minute interstices of the flakes. If much rock is put in the sulphuric acid, less commercial product results, for the rock takes up the space of the tablets or flakes and the acid must take more rock and earthy material into solution, thus reducing the acid's effectiveness and speed of action on subsequent batches of material. Consequently, one of applicants' aims was to obtain rock-free batches of flakes in greater quantities and in shorter periods of time.

A second aim was to speed up the leaching process. Flakes of greater thickness require a greater length of time for acid treatment than do the thinner flakes. Therefore, it was necessary after separation of the rock from the flakes, to further separate the flakes or tablets according to thickness. This fact is quite apparent when one considers that the thinner flakes may be fully treated in 6–8 hours and thicker flakes or tablets not completely leached in twice that time. Since that is so, it is wasteful to fill the acid bath with flakes of widely varying thicknesses since the thinner ones, when through this treatment, lie in the bath taking up the space where further unleached material could otherwise be treated.

Our invention, therefore, contemplates means for separating the flakes or tablet-like material from rock while simultaneously classifying or separating such flakes according to thickness. These and other objects and advantages of the present invention will be apparent to those skilled in the art after a consideration of the following detailed description, taken in conjunction with the accompanying drawings, in which:

Figure 3 is a diagram indicating the varying width of the discharge gap between the edge of the rotating turn-table and adjacent retaining wall as one traces said gap around the four divisions of the circumference of said retaining wall;

Figure 4 is a diagram indicating the varying width of the discharge gaps when two turn-tables are used in series, the dotted lines which lead down from the upper gap indicating the discharge of the material in compartment IV to the lower turn-table;

Figure 5 is a diagrammatic longitudinal section of an ore separator having two turn-tables in series; and Figure 6 is a perspective view of the tablet-like flakes compared with other material which has its three dimensions substantially equal to the smallest dimension of these flakes. The representation is about two times normal size.

Figure 1:
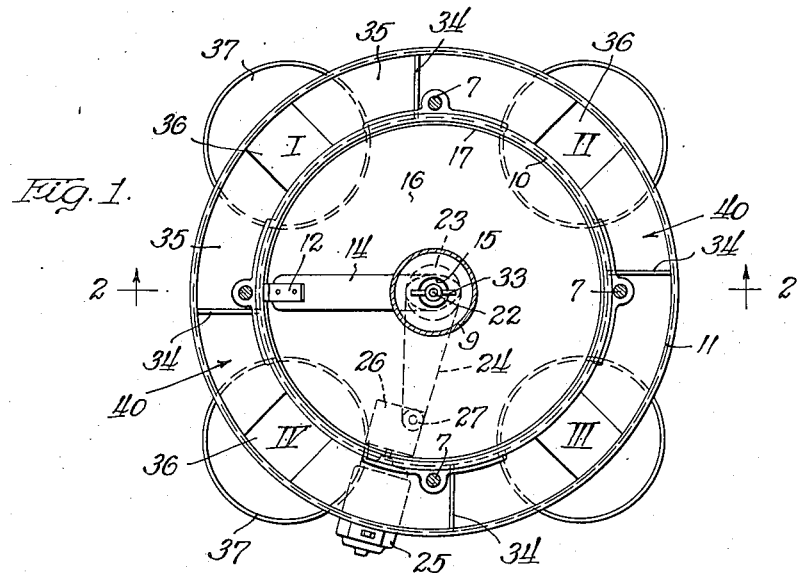
Figure 1 is a plan view of the ore separator with the hopper cut away along the lines 1—1 of Figure 2.
Figure 2:
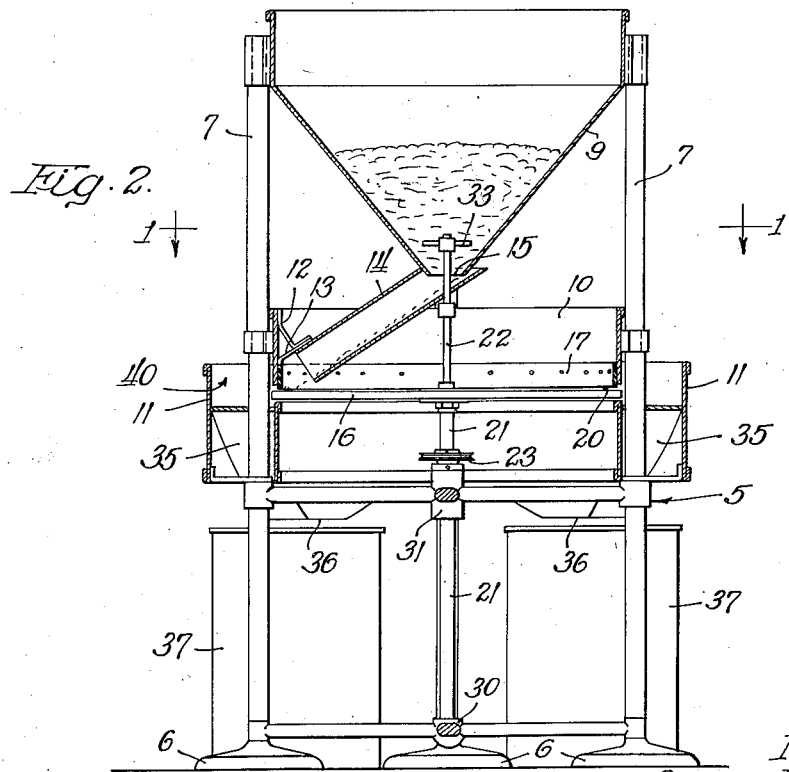
Figure 2 is a longitudinal section taken along the lines 2—2 of Figure 1.

Referring now to Figures 1 and 2, numeral 5 indicates generally the stand for supporting the separator mechanism. The numerals 6 indicate the feet of the stand 5, and 7 indicates the uprights to which are clamped the hopper 9, the retaining wall 10 and the outer wall 11. Brackets 12 and 13 support the chute 14 below the discharge mouth 15 of the hopper 9 whereby ore flows from the hopper into the chute 14 and thence on to the outer edge of the turn-table 16. A rubber strip 17 is fastened to and depends from the inside lower edge of the retaining wall 10. The turn-table 16 has a diameter slightly greater than that of the wall 10. There is a discharge gap 20 between the strip 17 and the face of the table 16. This gap varies in width as it passes completely around the wall 10. The chute 14 discharges to the turn-table 16 adjacent the narrowest part of the discharge gap 20 whence the rotation of the table 16 carries the material-to-be-separated past the increasingly widening portions of the gap 20 during each revolution of the table 16.

The turn-table 16 is mounted on the axle 21 which also bears an upper extension 22 and a pulley wheel 23. The pulley wheel 23 is driven from a motor 25 through a gear reducer 26, pulley-wheel 27 and pulley belt 24. Said pulley-wheel 23 drives the axle 21 which is borne in an end bearing 30 and a journal 31 which forms a part of the cross-bars of the stand 5. The extension 22 of the axle 21 passes through a close fitting hole of the chute 14 and extends up through the discharge mouth 15 and into the hopper 10. A cross piece 33 fastened to the extension 22 rotates with the driven axle 21 and prevents the ore in the hopper 9 from stopping up the discharge mouth 15.

The outer wall 11 stops the peripheral discharge of the flakes which are driven off the edge of the rotating turn-table 16 through the gap 20 by centrifugal force. The space surrounding the gap—i. e., the space between the outer wall 11 and retaining wall 10—is, in the illustrated device, divided into four equal compartments 40 by baffles 34. In each compartment so formed between said baffles are oppositely inclined slides 35 each of which lead downwardly to a hole 36 through which the flakes drop to be caught in containers 37.

To more clearly explain the action of our invention, we will now describe a sample operation of the illustrated device.

The raw ore is first crushed. This results in a mixed mass of rock and flakes. Nearly all of these flakes are flat and substantially round, the average diameter being about one-half inch and the average thickness about 2/64 to 3/64 inch. There are thinner flakes and thicker ones. The thickest ones being about 10/64 inch through. The rock is all, with a minute exception, more nearly equal in its three dimensions. The greatest part of it has a diameter greater than the thickness of the thickest tablets or flakes. A certain small proportion of the rock is made up of dust and granules whose diameter is about that of the thickness of the various tablets. But since these small bits of rock are substantially equal in their three dimensions, whereas the flakes (even the smallest ones) are wider than the diameter of these rocks, the small particles of rock may be initially screened out by a screen with a suitable mesh. This will prevent such rock material from being classified by our machine along with the desired flakes or tablets.

Figure 6 compares the shape of the flakes and rocky material just above described. The illustration is about two times life size.

Therefore, the first step is to screen the crushed ore to get rid of the smaller rock particles and rock dust. This screening will result in only the most minute bits of flakes being screened out, which loss is negligible. The remaining mixture is then dumped into the hopper 9. Then the motor 25 is started and this causes the turn-table 16 to revolve and the cross-bar 33 on the axle extension 22 to rotate and stir the ore so that it will continuously pass by force of gravity through the discharge mouth 15 of the hopper 9 into the chute 14 and thence onto the outer edge of the rapidly rotating (about 63 R. P. M.) turn-table 16. It will be remembered that the gap 20 is its narrowest just opposite the discharge end of the chute 14. As soon as the ore falls onto the turn-table, it instantly slides or rolls toward the gap between the rubber strip 17 and the turn-table 16 due to centrifugal force of the turn-table 16. The thinnest flakes instantly slip through the narrowest portion of the gap, strike the outer wall 11 or baffles 34, drop to a slide 35 and slide to a hole 36 and thence to a container 37. When the ore comes down the chute 14, some of the flat flakes are of such a substantially circular shape that they may, on reaching the turn-table 16, land on their thin edge and start to roll like a wheel. The centrifugal force will immediately cause them to roll over to the retaining wall 10 where they will rub along the wall tending to rotate in the direction of the turn-table but at a much lesser speed. If the retaining wall were just sheet metal without any rubber strip, these rolling flakes would have a tendency to rub along them for such a period of time that they would roll past the proper portion of the discharge gap. So to stop these flakes which come rolling down the chute 14 we have used the rubber strip 17 which has the tendency, due to friction, to both stop the rolling flakes and to immediately knock them over flat so that they will slip through the gap 20 at the position corresponding to their thickness.

It is apparent, of course, that more than four compartments could be used to classify the flakes if desired. A tabulated experiment of a machine with five such compartments will follow shortly.

At the same instant and at the same spot where the thinnest flakes are shot out through the gap, the thicker flakes and rocks strike the strip 17 but can't get through. They therefore rapidly travel along said strip 17 in the direction of rotation of the turn-table until the gap widens enough to let them through. At the end of one rotation then the original batch of ore will have been distributed into the four compartments and containers and graded according to thickness. Since the chute 14 is made to discharge outwardly from the center of the turn-table 16 and at its periphery at the point where the gap 20 is narrowest, and since the table 16 is rotated very rapidly the flakes will be flung against the gap or strip 17 immediately upon reaching the turn-table. Therefore the thinner flakes will not have time to ride around and be discharged with the thicker flakes at a point where the gap 20 is wider. Otherwise, most of the flakes, both thick and thin, would fall into the compartment having the widest gap opening into it. In operation, of course, a certain small portion of the flakes are carried along and flung into a compartment where the gap is a size larger than the thickness of the flakes. But this happens to a very small percentage of the flakes.

Since the hopper 9 is full to begin with, a continuous discharge of ore is made to the turn-table 16 via the chute 14. This separation continues as long as ore remains in or is fed to the hopper. When the operation ceases, there will be four sizes of flakes in the four containers. In the last container there will be a mixture of rock and thick flakes. This mixture may be mixed with a new batch of ore which is introduced to the hopper 9.

In Figure 3 the retaining wall 10 and its rubber strip 17 have been cut through right at the point where the left-hand baffle 34 (Figure 1) touches the wall 10, and then unfolded and laid flat against the sheet of drawings. (The scale is not the same as in Figure 1.) The Roman numeral I is at the left of Figure 3 and represents the compartment I of Figure 1. As will be seen from the chart, the gap 20 increases in width from left to right, i. e., clockwise starting from the left hand baffle 34 of Figure 1. The distance between the strip 17 and the turn-table 16 for the illustrated device is only 2/64" at the left of the chart but increases to 12/64" or 3/16" at the right side. From left to right on Figure 3 represents the complete circle of the wall 10 and the vertical dot-dash lines represent the places along such wall where the baffle plates 34 form the four compartments into which the flakes are flung.

In an actual test run on one ore separator (having five compartments instead of four) we used 100 pounds of sieved ore and fed it at a speed of five pounds per minute (300 lbs. per hr.). The rock content of this ore was 4.55%. Now prior to development of this separator it took each individual man over eight hours to separate one hundred pounds of the ore, and no worker could be allowed to work more than six hours a day. In twenty minutes with our machine we separated the 100 pounds as follows:

| Size | Corresponding to— | Pounds | Remarks |
|---|---|---|---|
| #1 | Compartment I | 8.77 | Practically rock free. |
| #2 | Compartment II | 41.76 | Do. |
| #3 | Compartment III | 25.57 | 0.15% rock. |
| #4 | Compartment IV | 12.31 | 5.15% rock. |
| Rejects | Compartment V [1] | 11.59 | 35.75% rock. |

[1] In the illustrated device there are only four compartments.

Sizes #1, 2, and 3 were ready for leaching at once in separate baths of acid. Size #1 leaches more quickly than the others for the flakes are the thinnest of them all.

Then we took size #4=12.31 lbs. and the rejects=11.59 lbs. and repassed the mixture; we had:

Ore used _____ 23.90 lbs.
Feeding speed _____ 2 lbs./min. (120 lbs./hr.)
Rock content _____ 19.95%
Size #1 _____ 0.51 lb. practically rock free
Size #2 _____ 1.93 lbs. practically rock free
Size #3 _____ 4.77 lbs. 0.89% rock
Size #4 _____ 6.85 lbs. 5.27% rock
Rejects _____ 9.84 lbs. 41.75% rock If these quantities are combined with that of the first separation, we have—

Size #1 _____ 9.28 lbs.
Size #2 _____ 43.69 lbs.
Size #3 _____ 30.34 lbs.
Size #4 _____ 6.85 lbs. 5.27% rock
Rejects _____ 9.84 lbs. 41.75% rock Sizes #1, 2, and 3 represent 83.31% of the ore. Size #4 can then be mixed with fresh ore for further recovery.

The repassing of size #4 causes many of the thicker flakes to break up into thinner ones as they drop from the hopper into the chute and then to the turn-table. In addition such of the ore as consists of rock joined to flakes will often be knocked apart by reason of the dropping and bouncing of the ore and thus release more flakes. Furthermore, such of the thin flakes as accidently were cast into compartment IV will be reclassified properly upon being repassed.

Since this repassing produces over seven pounds of flakes having less than 1% rock content, we found it desirable to construct a separator having two turn-tables as represented diagrammatically by Figure 5. The upper turn-table 16 and the secondary turn-table 16' are both fastened to the same axle 21. Compartments I, II, and III of the upper table 16 discharge directly into containers such as 37 (see in the illustration the catching of flakes from compartment II). But compartment IV discharges down the slide 38 onto the turn-table 16' whence the size #4 flakes and rock are reclassified into compartments V, VI, VII and VIII surrounding the retaining wall 10'. The flakes slide from compartments V, VI, VII and VIII down slides such as 35' into containers such as 37'. It will be noted that the size #4 flakes are dropped on the periphery of the secondary turn-table 16' adjacent the narrowest part of the gap 20' between the strip 17' and table 16' just as is done for the upper turn-table.

Referring now to the diagram in Figure 4 which is comparable to Figure 3 except that two retaining walls, two rubber strips, two gaps and two turn-tables are shown. The gap 20' may correspond in size to that of gap 20 or may be larger. (There is no object in making the gap smaller since the contents of compartment IV consist of rocks and thick flakes.) For example, for compartment V the gap may correspond in size to the gap of compartment II of the upper turn-table. In practice this last-mentioned plan is used for such of the thinnest flakes as failed to pass originally into compartment I generally have slipped into compartment II or III so that the flakes in compartment IV, which are the flakes to be repassed, contain none or practically none of the flakes that should have passed into compartment I. The gap 20' then may be about 6/64" at its smallest end and increase to about 16/64" or 1/4". So the flakes from compartments II and V would be combined as would those from III and VI. The material in compartment VII could then be mixed with fresh ore and that from compartment VIII could be discarded.

It will be clear from the above, that the classifier and separator of our invention comprises a retaining wall and a subjacent supporting surface defining between them a gap or slot increasing in height in one direction, the supporting surface being driven in one direction such that, during travel thereof the flat pieces of material lying thereon are constantly urged toward the wall and held in edgewise contact therewith and are continuously moved along the wall in the direction of increase in height of the slot. As the pieces of material reach the areas of the slot through which they can pass, they are no longer restrained by the wall and are discharged through the slot by the force urging them outward in the direction of the wall. In that manner the pieces of material are quickly separated and classified according to their different thicknesses, and that is accomplished without subjecting them to any considerable agitation or breakage or other abuse or producing excessive wear upon the mechanism. The separating and classifying operation comprises disposing the flat pieces of material flatwise on a supporting surface defining with a retaining wall a slot increasing in height in one direction, and driving the supporting surface in such a direction as to urge the pieces into edgewise contact with the wall and holding them thereunder suitable pressure toward the wall, while moving them along the wall in the direction of increase in height of the slot, and discharging the pieces edgewise through the slot by the outward component of force to which they are subjected, as they pass out of contact with the retaining wall into an area of the slot through which they will readily pass. Vermiculite and similar materials have pronounced planes of cleavage and, in general, the individual pieces thereof will be of flat or tablet-like. If a piece of such material be of varying thickness, due to the presence of foreign materials, it may in the first instance pass but part way through the slot. In that event, such a piece will continue to travel with the supporting surface until it reaches a higher portion of the slot, through which it will be discharged. The travel of the supporting surface in one direction, as above, is of importance as eliminating jamming of the material between the retaining wall and the traveling supporting surface. The materials with which our invention is concerned are siliceous and abrasive in character, and the contained foreign materials, such as the pieces of rock, are quite hard. We have found by experience that any jamming or binding of the pieces of materials, between the retaining wall and the traveling supporting surface, soon results in objectionable wear and damage to both parts in addition to causing excessive breakage of the material under treatment. If the supporting surface were driven in alternately opposite directions, pieces of material jammed in the slot would become jammed more tightly, aggravating the objectionable wear and breakage referred to. By driving the supporting surface continuously in one direction we avoid that difficulty and move the pieces of material continuously along the slot in the direction of increase in height thereof, which has the further advantage of greatly expediting the separating and classifying of the pieces of materials. The rubber strip 17, which constitutes the retaining wall against which the pieces of material are pressed outward and along which they travel, is not readily abraded by the material and has long life. In the event it becomes worn to an objectionable extent, it may readily be replaced.

Briefly, then, applicants had two goals: (1) a means for separating the flat flakes from the rock, and (2) means for grading the flakes according to thickness after they were so separated. In this one device, as described and as substantially illustrated, applicants were able to accomplish the two goals.

Since further changes may be made in the foregoing constructions, and different embodiments of the invention may be made without departing from the scope thereof, it is intended that all matter shown in the accompanying drawings or described hereinbefore shall be interpreted as illustrative and not in a limiting sense.

We claim as our invention:

In an ore separator, in combination, a feeding funnel, a chute from said funnel for discharging ore on to the outer edge of a driven turntable in a radial direction so that said driven turntable will, by its centrifugal force, fling said ore outwardly against a circular wall disposed around and slightly above said turntable, a rubber strip fastened on the inside of said circular wall about its lower edge so that it may, by its frictional surface, stop the wheel-like rotation of any flat material on the revolving turntable, a gap between the surface of said turntable and the bottom edge of said circular wall, said gap having its narrowest point adjacent the discharge chute so that the thinnest material can immediately be flung therethrough, said gap increasing in width around the circumference of said circular wall in the direction of rotation of the turntable so that the thicker material will be carried around on said turntable and be flung out at a point where the gap is substantially the width of said material, an axle for carrying the turntable and a pulley which is connected to the source of driving power, an extension on said axle projecting upwardly into said feeding funnel, a cross bar on said extension adapted to stir the ore in the funnel so that it will feed through constantly when the axle is being driven and is turning the turntable, and compartments spaced around the outside of said gap for segregating material of substantially the same thickness.

OSCAR J. WILBOR.
JOSEPH T. MISIAK.